(12) United States Patent
Na et al.

(10) Patent No.: US 10,749,733 B2
(45) Date of Patent: Aug. 18, 2020

(54) APPARATUS AND METHOD FOR CONTROLLING NETWORK DEVICE BASED ON NETWORK SERVICE IN COMMUNICATION SYSTEM

(71) Applicant: Electronics and Telecommunications Research Institute, Daejeon (KR)

(72) Inventors: Tae Heum Na, Daejeon (KR); Pyung Koo Park, Daejeon (KR); Ho Yong Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 31 days.

(21) Appl. No.: 16/267,939

(22) Filed: Feb. 5, 2019

(65) Prior Publication Data
US 2019/0268212 A1    Aug. 29, 2019

(30) Foreign Application Priority Data
Feb. 28, 2018  (KR) .................... 10-2018-0024401

(51) Int. Cl.
*H04L 15/16* (2006.01)
*H04L 12/24* (2006.01)
*H04L 29/06* (2006.01)

(52) U.S. Cl.
CPC ...... *H04L 41/0226* (2013.01); *H04L 41/0213* (2013.01); *H04L 41/12* (2013.01); *H04L 69/08* (2013.01)

(58) Field of Classification Search
CPC . H04L 41/0226; H04L 41/0213; H04L 41/12; H04L 69/08
See application file for complete search history.

(56) References Cited

U.S. PATENT DOCUMENTS

| | | | | |
|---|---|---|---|---|
| 7,676,786 | B2* | 3/2010 | Shenfield | G06F 8/10 717/104 |
| 8,375,354 | B2* | 2/2013 | Shenfield | G06F 8/10 717/104 |
| 8,775,615 | B2 | 7/2014 | Jalaldeen et al. | |
| 9,325,719 | B2* | 4/2016 | Lloyd | H04L 63/102 |

(Continued)

FOREIGN PATENT DOCUMENTS

| | | |
|---|---|---|
| JP | 2010-72770 A | 4/2010 |
| KR | 10-2003-0083491 A | 10/2003 |

(Continued)

*Primary Examiner* — Moustafa M Meky
(74) *Attorney, Agent, or Firm* — NSIP Law

(57) ABSTRACT

An operation method of a server in a communication system may comprise receiving device information from each of a plurality of devices; generating service modeling information for each of a plurality of services; generating category modeling information for sub-services of each of the plurality of services based on the device information and the service modeling information; receiving service information; generating device modeling information corresponding to the category modeling information based on the service information; and transmitting the device modeling information to each of the plurality devices corresponding to the device modeling information, wherein the device modeling information includes configuration information for a network service function corresponding to a device corresponding to the device modeling information.

20 Claims, 15 Drawing Sheets

(56) References Cited

U.S. PATENT DOCUMENTS

| | | | |
|---|---|---|---|
| 10,057,136 B2 * | 8/2018 | Wei | H04L 41/145 |
| 2008/0059623 A1 | 3/2008 | Yang et al. | |
| 2008/0188244 A1 * | 8/2008 | Mazlum | G01S 5/0252 |
| | | | 455/456.6 |
| 2010/0153551 A1 | 6/2010 | Kim et al. | |
| 2011/0153651 A1 | 6/2011 | Kim et al. | |
| 2013/0117003 A1 * | 5/2013 | Son | G06F 30/30 |
| | | | 703/13 |
| 2014/0229588 A1 * | 8/2014 | Hjelm | H04L 12/281 |
| | | | 709/220 |
| 2016/0337200 A1 * | 11/2016 | Wei | H04L 41/145 |
| 2017/0331669 A1 | 11/2017 | Ganesh et al. | |

FOREIGN PATENT DOCUMENTS

| | | |
|---|---|---|
| KR | 10-0440059 B1 | 7/2004 |
| KR | 10-0636784 B1 | 10/2006 |
| KR | 10-2013-0069009 A | 6/2013 |
| KR | 10-2015-0038245 A | 4/2015 |
| KR | 10-2017-0045586 A | 4/2017 |
| WO | WO 2014/012596 A1 | 1/2014 |

\* cited by examiner

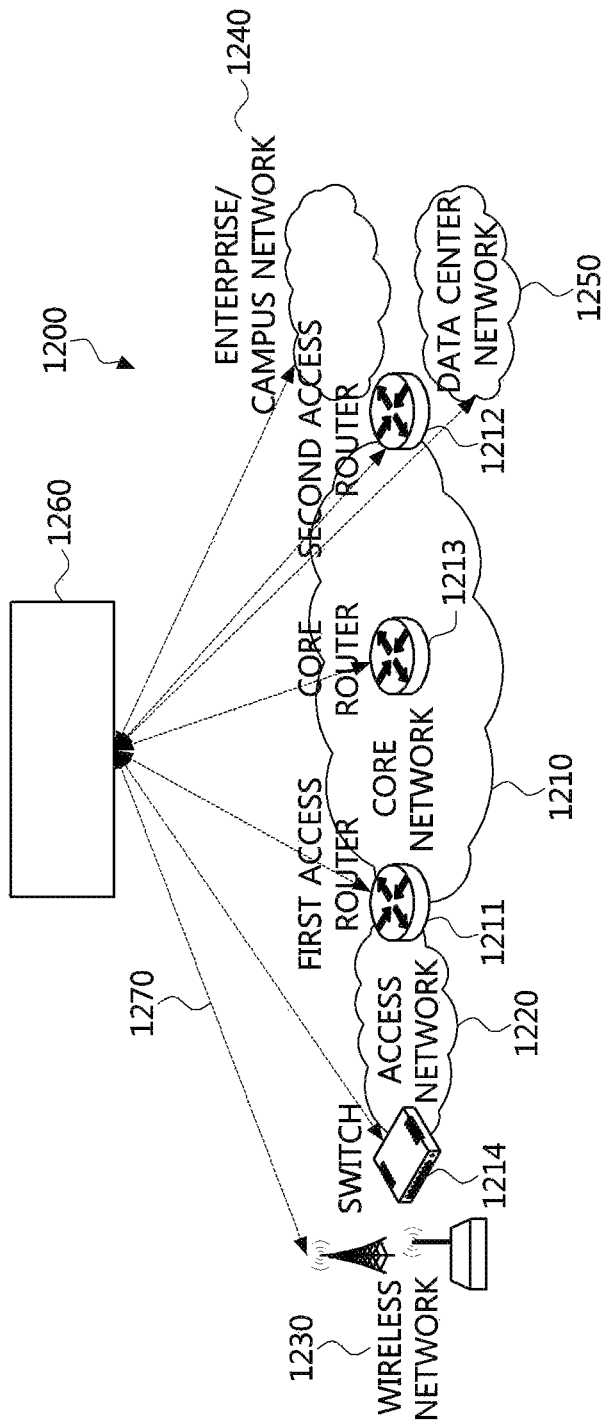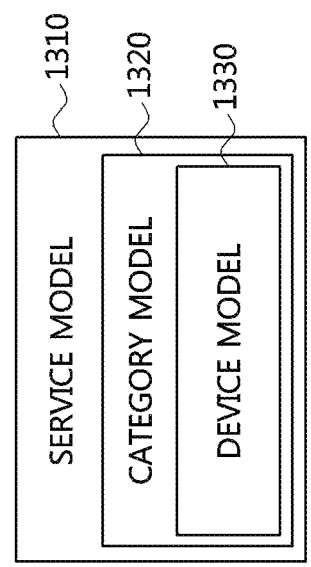

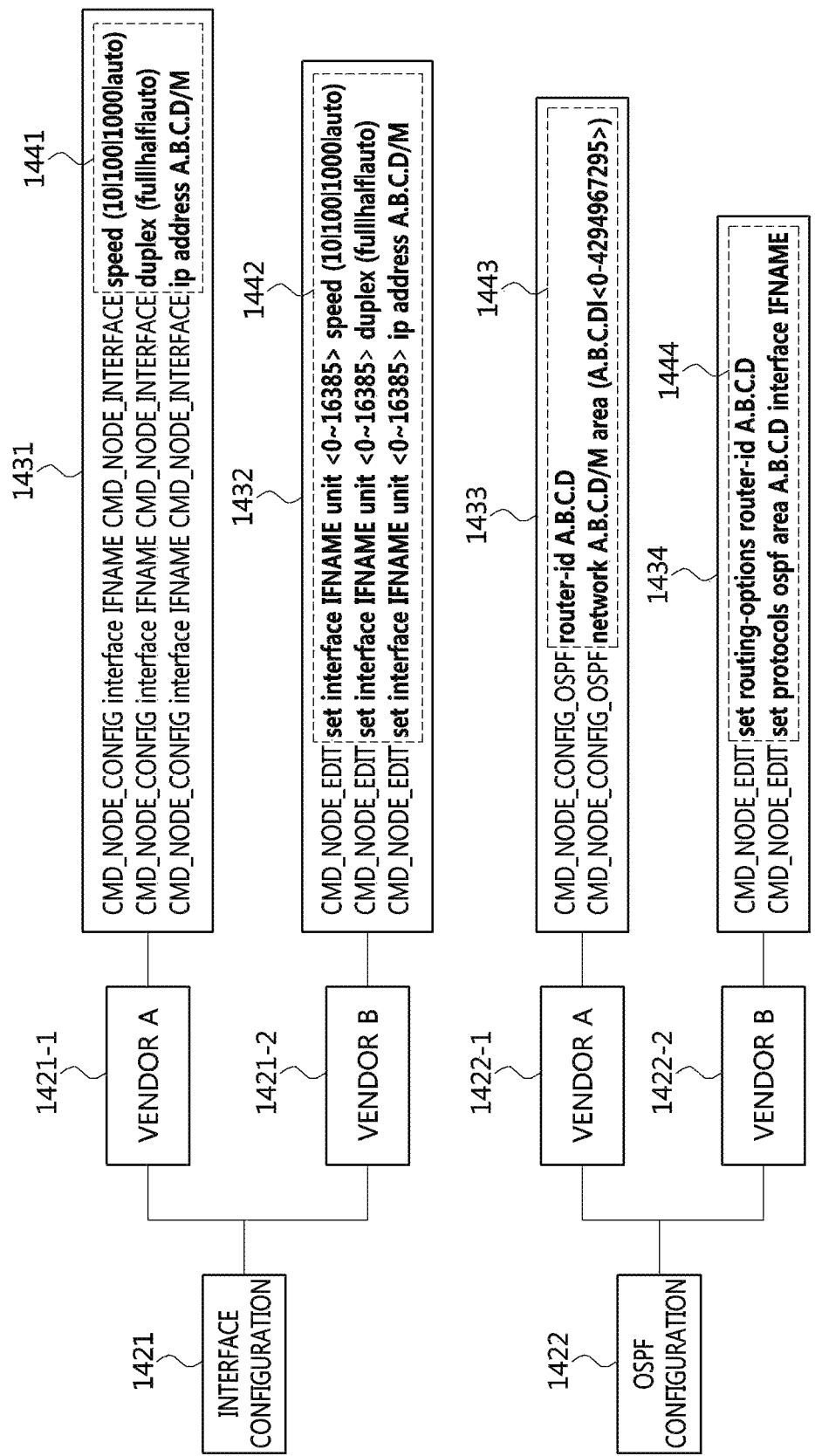

APPARATUS AND METHOD FOR CONTROLLING NETWORK DEVICE BASED ON NETWORK SERVICE IN COMMUNICATION SYSTEM

CROSS-REFERENCE TO RELATED APPLICATIONS

This application claims priority to Korean Patent Application No. 10-2018-0024401 filed on Feb. 28, 2018 in the Korean Intellectual Property Office (KIPO), the entire contents of which are hereby incorporated by reference.

BACKGROUND

1. Technical Field

The present disclosure relates to a communication system, and more specifically, to an apparatus and a method for controlling a network device based on a network service in a communication system.

2. Related Art

The conventional method for remotely controlling a network device may be a method using a simple network management protocol (SNMP). In the method using the SNMP, it may be difficult to collectively control network devices of different multi-vendors because there is no predetermined standardization between the SNMP and managed objects (MOs) of network devices.

The SNMP agent can collect configuration of each of a plurality of managed objects to manage the plurality of managed objects as a single system. The SNMP agent can perform separate processing so that the configuration of each of the plurality of managed objects can be applied to a single system. Also, the configuration of each of the plurality of managed objects may be changed or deleted. Therefore, the SNMP agent has to additionally perform additional processing for the changed or deleted configuration. In addition, even when the separate processing of the configuration of each of the plurality of managed objects is completed, the processed configurations may not be compatible when the system is changed. Therefore, the SNMP agent has a difficulty in management because a single function is required to be performed for the plurality of managed objects.

SUMMARY

Accordingly, embodiments of the present disclosure provide an apparatus and a method for automatically configuring an end-to-end network for efficient implementation of various network services by using communication networks comprising network devices of multiple vendors.

In order to achieve the objective of the present disclosure, an operation method of a server in a communication system may comprise receiving device information from each of a plurality of devices; generating service modeling information for each of a plurality of services; generating category modeling information for sub-services of each of the plurality of services based on the device information and the service modeling information; receiving service information; generating device modeling information corresponding to the category modeling information based on the service information; and transmitting the device modeling information to each of the plurality devices corresponding to the device modeling information, wherein the device modeling information includes configuration information for a network service function corresponding to a device corresponding to the device modeling information.

The device information may be received through a communication protocol corresponding to each of the plurality of devices, the device modeling information may be transmitted through a communication protocol corresponding to each of the plurality of devices, and the communication protocol may include at least one of a network configuration protocol (NETCONF), a simple network management protocol (SNMP), a representational state transfer (REST) application programming interface (API), a command line interface (CLI), a Web, and an OpenFlow.

The operation method may further comprise transmitting the service modeling information to the plurality of devices, wherein the service modeling information is represented by an extensible markup language (XML), and includes configuration information for each of the sub-services.

The category modeling information may be information on a network function that is performed by a combination of commands, and may include the device modeling information.

The device information may include at least one of a device name, a communication interface name, an Internet protocol (IP) address, a medium access control (MAC) address, a communication interface type, physical layer information, logical layer information, uplink information, and downlink information.

The operation method may further comprise generating network topology information based on the device information; and outputting the network topology information through a user interface, wherein the network topology information includes at least one of a network name, a device name, a communication interface name, an IP address, and a MAC address.

The outputting the network topology information may comprise displaying a network icon corresponding to the network name, a device icon corresponding to the device name, a communication interface icon corresponding to the communication interface, and an IP address icon corresponding to the IP address; and displaying a connection relationship among the icons.

The operation method may further comprise receiving failure information from a corresponding device when a network failure occurs; and updating the service modeling information, the category modeling information, the device modeling information, and the network topology information based on the failure information.

The service information may include at least one of a communication interface name, communication speed information, duplex scheme information, communication range information, and IP address information.

The service modeling information, the category modeling information, and the device modeling information may be generated through a yet another next generation (YANG) data modeling language.

In order to achieve the objective of the present disclosure, a server in a communication system may comprise a processor and a memory storing at least one instruction executed by the processor. Also, the at least one instruction may be configured to receive device information from each of a plurality of devices; generate service modeling information for each of a plurality of services; generate category modeling information for sub-services of each of the plurality of services based on the device information and the service modeling information; receive service information; generate device modeling information corresponding to the category modeling information based on the service information; and transmit the device modeling information to each of the plurality devices corresponding to the device modeling information, wherein the device modeling information includes configuration information for a network service function corresponding to a device corresponding to the device modeling information.

The at least one instruction may be further configured to receive the device information through a communication protocol corresponding to each of the plurality of devices, and transmit the device modeling information through a communication protocol corresponding to each of the plurality of devices, and the communication protocol may include at least one of a network configuration protocol (NETCONF), a simple network management protocol (SNMP), a representational state transfer (REST) application programming interface (API), a command line interface (CLI), a Web, and an OpenFlow.

The at least one instruction may be further configured to transmit the service modeling information to the plurality of devices, wherein the service modeling information is represented by an extensible markup language (XML), and includes configuration information for each of the sub-services.

The category modeling information may be information on a network function that is performed by a combination of commands, and may include the device modeling information.

The device information may include at least one of a device name, a communication interface name, an Internet protocol (IP) address, a medium access control (MAC) address, a communication interface type, physical layer information, logical layer information, uplink information, and downlink information.

The at least one instruction may be further configured to generate network topology information based on the device information; and output the network topology information through a user interface, and the network topology information may include at least one of a network name, a device name, a communication interface name, an IP address, and a MAC address.

The at least one instruction may be further configured to display a network icon corresponding to the network name, a device icon corresponding to the device name, a communication interface icon corresponding to the communication interface, and an IP address icon corresponding to the IP address; and display a connection relationship among the icons.

The at least one instruction may be further configured to receive failure information from a corresponding device when a network failure occurs; and update the service modeling information, the category modeling information, the device modeling information, and the network topology information based on the failure information.

The service information may include at least one of a communication interface name, communication speed information, duplex scheme information, communication range information, and IP address information.

The service modeling information, the category modeling information, and the device modeling information may be generated through a yet another next generation (YANG) data modeling language.

The server according to the embodiments of the disclosure can model and apply a network service that meets various requirements of a user, and can easily change configuration of a network according to a network failure. Further, through the server according to the embodiments of the present disclosure, it is made possible to easily control a communication network composed of multi-vendor network devices, and reduce dependency on a specific communication protocol. Further, by controlling communication networks as a whole through the server according to the embodiments of the present disclosure, a communication network operation cost can be reduced. In addition, through the server according to the embodiments of the present disclosure, it is made possible to support software defined networks (SDN) and network function virtualization (NFV).

BRIEF DESCRIPTION OF DRAWINGS

Embodiments of the present disclosure will become more apparent by describing in detail embodiments of the present disclosure with reference to the accompanying drawings, in which:

FIG. 12 is a conceptual diagram illustrating a multi-node service of a server in a communication network according to a third embodiment of the present disclosure;

FIG. 13 is a conceptual diagram illustrating a relationship between a service model and a device model generated by a server in a communication network according to the third embodiment of the present disclosure;

FIG. 14 is a conceptual diagram illustrating a category model generated by a server in a communication network according to the third embodiment of the present disclosure;

DETAILED DESCRIPTION

Figure 1:
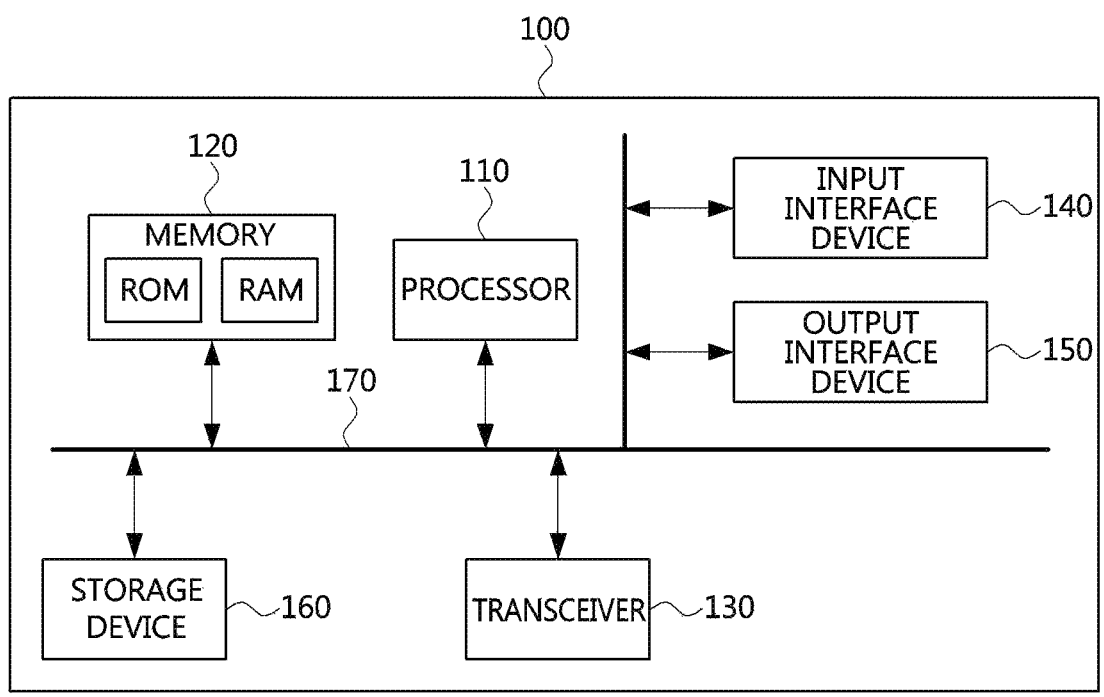
FIG. 1 is a conceptual diagram illustrating a communication node according to a first embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

FIG. 1 is a conceptual diagram illustrating a communication node in a communication system according to a first embodiment of the present disclosure.

A communication system (not shown) may comprise a plurality of communication nodes (not shown). Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Referring to FIG. 1, a communication node 100 may comprise at least one processor 110, a memory 120, and a transceiver 130 connected to the network for performing communications. Also, the communication node 100 may further comprise an input interface device 140, an output interface device 150, a storage device 160, and the like. Each component included in the communication node 100 may communicate with each other as connected through a bus 170.

However, each component included in the communication node 100 may be connected to the processor 110 via an individual interface or a separate bus, rather than the common bus 170. For example, the processor 110 may be connected to at least one of the memory 120, the transceiver 130, the input interface device 140, the output interface device 150, and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM).

Figure 2:
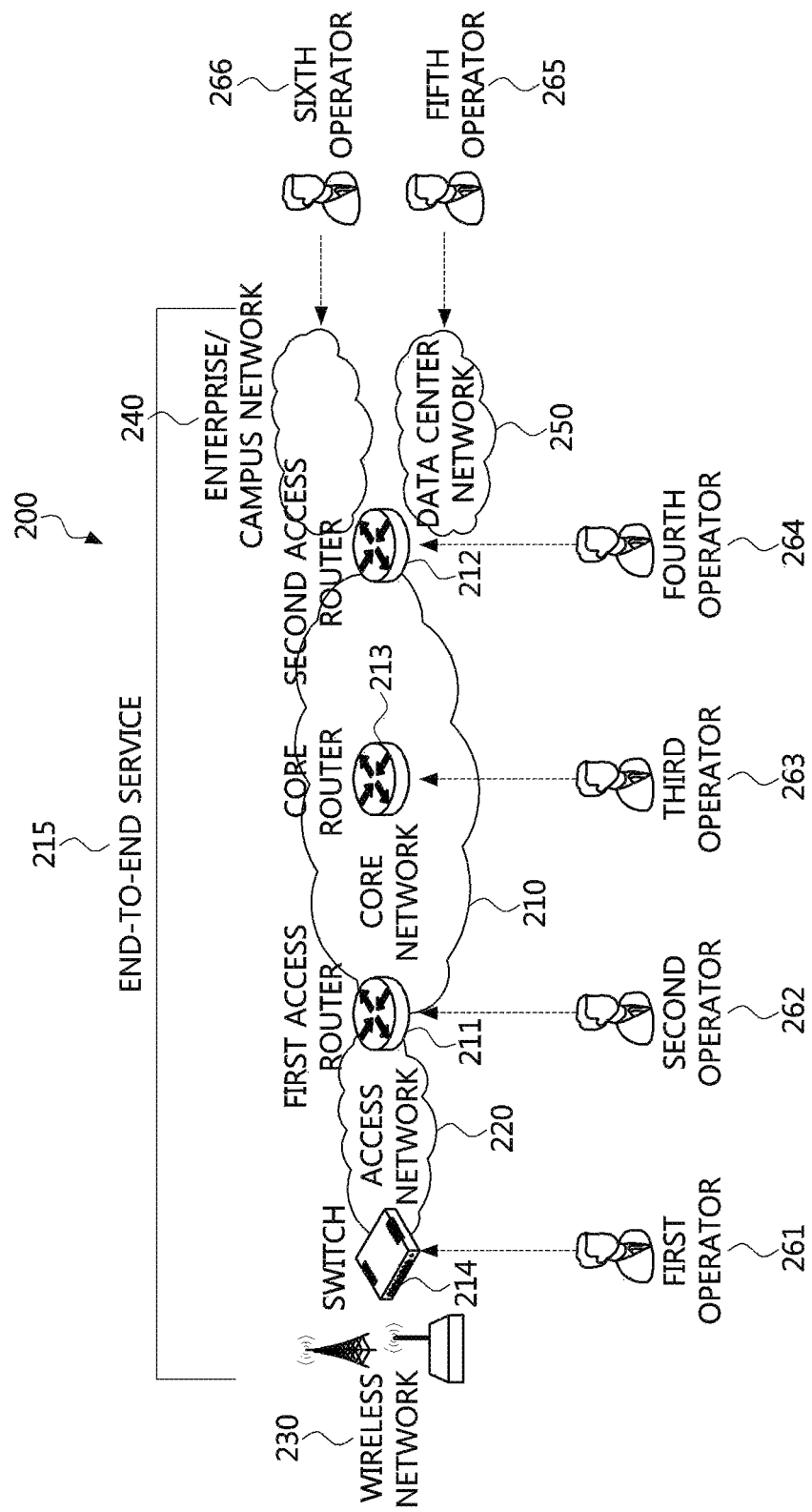
FIG. 2 is a conceptual diagram illustrating a configuration of a communication network according to a second embodiment of the present disclosure.

FIG. 2 is a conceptual diagram illustrating a configuration of a communication network according to a second embodiment of the present disclosure.

Referring to FIG. 2, a communication network 200 may include a core network 210 and an access network 220. The core network 210 may generally perform three functions. For example, the core network 210 may perform a function to manage subscriber information such as a subscriber's number and a subscriber's current location, a function to connect with a wired network service, and a function to provide additional supplementary services. The core network 210 may be classified into a part for managing the entire network as a whole and a part connected to the access network 220 for each area.

The access network 220 may be a network that is directly connected to the subscriber. The access network 220 may perform subscriber number processing, service connection, and information transmission/reception functions. A main base of the access network 220 may be a base station.

The access network 220 may be classified into various types of networks according to purposes. For example, the access network 220 may be classified into a wireless network 230, an enterprise/campus network 240, and a data center network 250. That is, the access network 220 may operate in the same or similar manner as the wireless network 230, the enterprise/campus network 240, and the data center network 250.

The wireless network 230 may be a network using wireless data connection between network nodes. For example, the wireless network 230 may refer to a communication network that delivers signals over radio waves instead of wired cables. The enterprise/campus network 240 may refer to an internal network used within a specific group. For example, the enterprise/campus network 240 may be a communication network used within an enterprise or a university. The data center network 250 may be a communication network used in a facility providing network lines and server computers. For example, the data center network 250 may include an Internet data center (IDC) network or a cloud data center network.

Each of the networks 210 to 250 may be connected through various types of network devices. For example, the core network 210 and the access network 220 may be connected through a first access router 211. Also, the access network 220 and the wireless network 230 may be connected through a switch 214. Also, the core network 210, the enterprise/campus network 240, and the data center network 250 may be connected through a second access router 212. Here, internal components of the core network 210 may be connected through a core router 213.

Each of the routers 211 to 213 may be a network device that extracts a location of a data packet, designates an optimal path according to the location of the data packet, and transmits the data packet to the next network device. The routers 211 to 213 may be classified into the first access router 211, the second access router 212, and the core router 213 according to the uses of the respective routers. The switch 214 may be a network device that transmits a data packet received from an arbitrary host to a host designated as a destination of the data packet.

Typical network services may be supported through connections among the above-described networks. The network service may be referred to as an end-to-end service. Each network device may be managed by an operator. For example, the switch 214 may be managed by a first operator 261. The first access router 211 may be managed by a second operator 262, the core router 213 may be managed by a third operator 263, and the second access router 212 may be managed by a fourth operator 264. The data center network 250 may be operated by a fifth operator 265. Also, the enterprise/campus network 240 may be operated by a sixth operator 266.

Here, a structure of each of the first access router 211, the second access router 212, the core router 213, the switch 214, and a server (not shown) of each of the networks 210 to 250 may be the same as or similar to the structure of the communication node 100 of FIG. 1. Although FIG. 2 illustrates 5 communication networks 210 to 250 for ease of description, the number of communication networks may be less than 5 or more than 5. Also, although FIG. 2 illustrates 4 network devices 211, 212, 213, and 214, the number of network devices may be less than 4 or more than 4. Also, although FIG. 2 illustrates 6 operators 261 to 266, but the number of operators may be less than 6 or more than 6.

Figure 3:
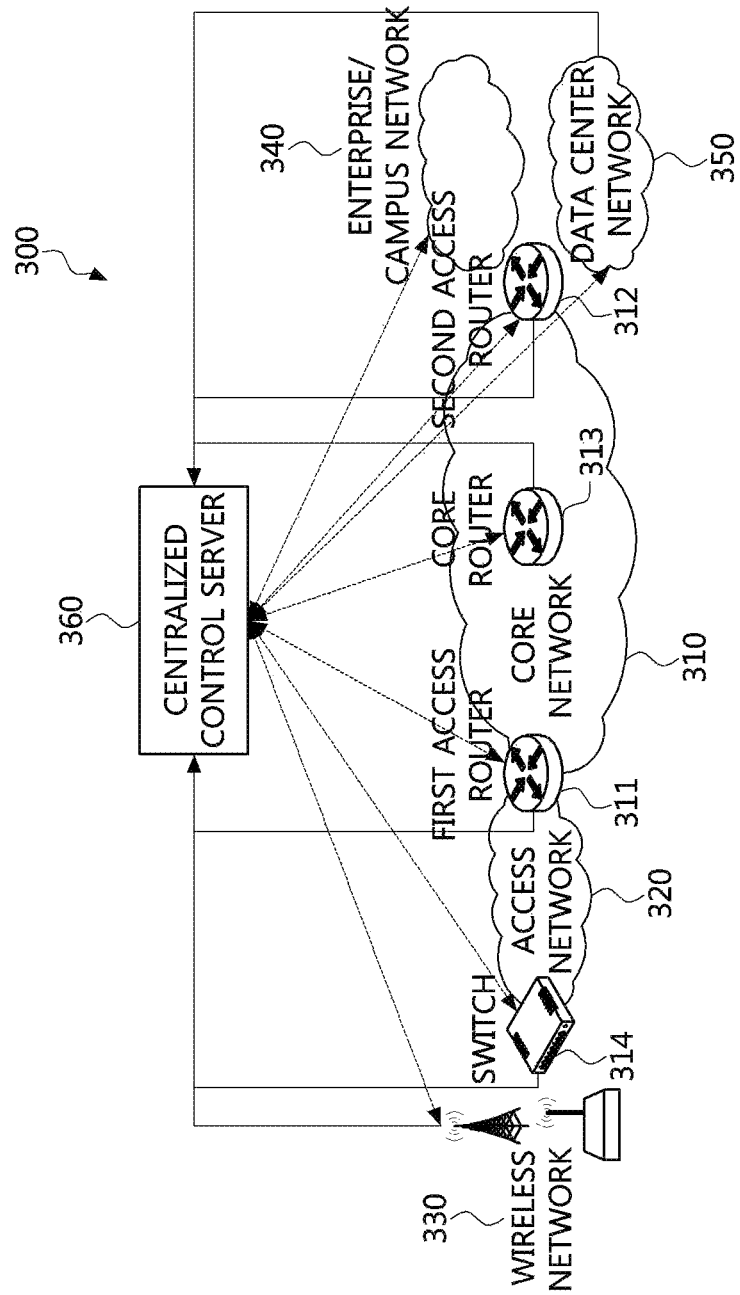
FIG. 3 is a conceptual diagram illustrating a communication network including a centralized control server according to a second embodiment of the present disclosure.

FIG. 3 is a conceptual diagram illustrating a communication network including a centralized control server according to a second embodiment of the present disclosure.

Referring to FIG. 3, a communication network 300 may include a core network 310 and an access network 320. The access network 320 may include a wireless network 330, an enterprise/campus network 340, a data center network 350, and a centralized control server 360.

The communication network 300 may operate in the same or similar manner as the communication network 200 of FIG. 2. That is, sub-networks 310 to 350 and network devices 311 to 314 of the communication network 300 may be the same as or similar to the sub-networks 210 to 250 and network devices 211 to 214 of the communication network 200 of FIG. 2.

The centralized control server 360 may be connected to each of the sub-networks 310 to 350 and the network devices 311 to 314 of the communication network 300. For example, the centralized control server 360 may be connected to each of the sub-networks 310 to 350 and the network devices 311 to 314 through a simple network management protocol (SNMP). Here, the connections between the centralized control server 360 and the sub-networks 310 and 320 and the network devices 311 to 314 may not be standardized. Also, the centralized control server 360 may not obtain management information base (MIB) for all of the sub-networks 310 to 350 and the network devices 311 to 314. Thus, the centralized control server 360 may not be able to control all of the sub-networks 310 to 350 and the network devices 311 to 314.

Figure 4:
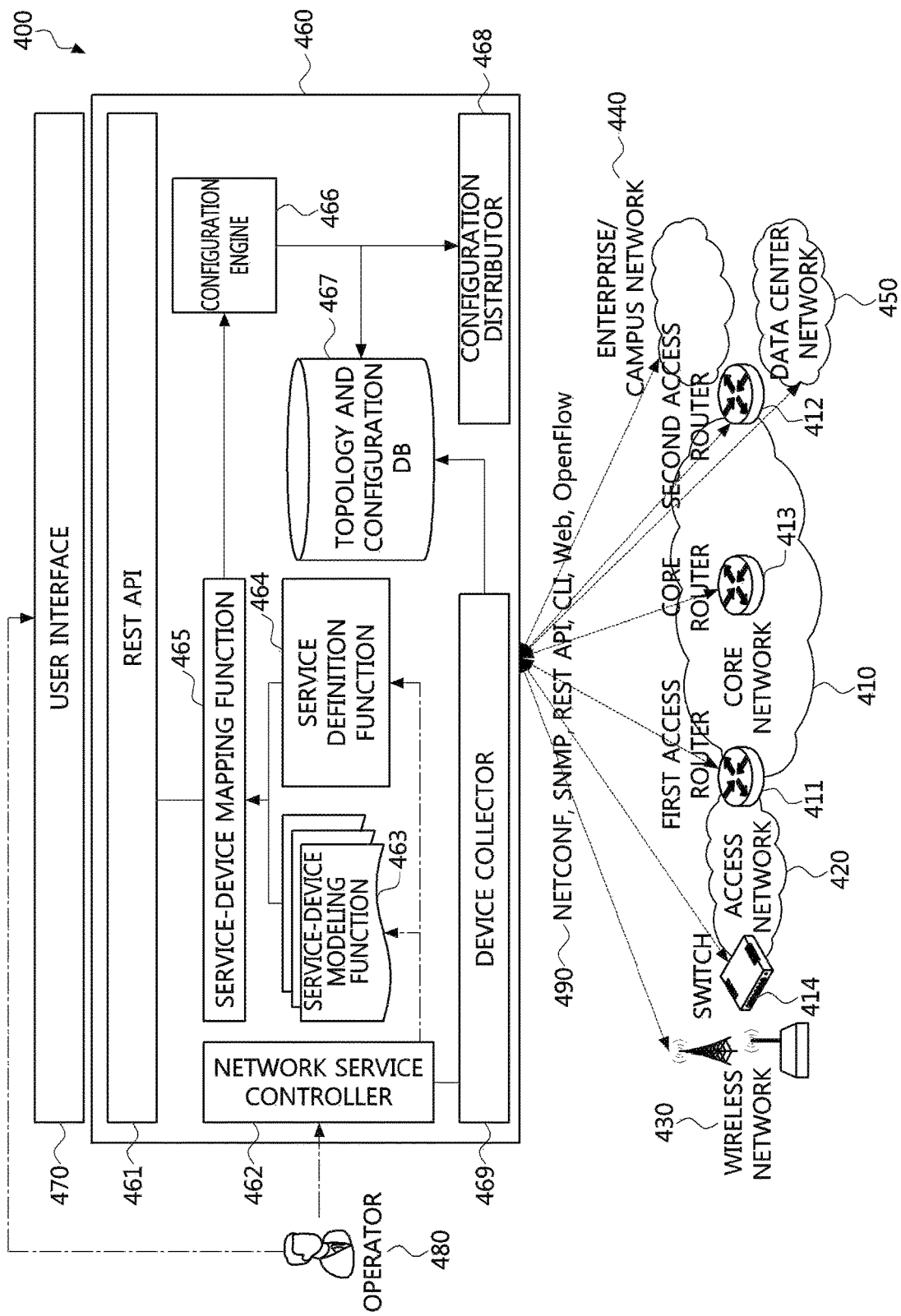
FIG. 4 is a conceptual diagram illustrating a communication network including a server according to a third embodiment of the present disclosure.

FIG. 4 is a conceptual diagram illustrating a communication network including a server according to a third embodiment of the present disclosure.

Referring to FIG. 4, a communication network 400 may include a core network 410 and an access network 420. The access network 420 may include a wireless network 430, an enterprise/campus network 440, a data center network 450, a server 460, and a user interface (UI) 470. Sub-networks 410 to 450 and network devices 411 to 414 of the communication network 400 may be the same as or similar to the sub-networks 310 to 350 and network devices 311 to 314 of the communication network 300 of FIG. 3.

The server 460 may automatically configure the network device by mapping network device configuration information for each network service. The server 460 includes a representational state transfer (REST) application programming interface (API) 461, a network service controller 462, a service-device modeling function 463, a service definition function 464, a service-device mapping function 465, a configuration engine 466, a topology and configuration database (DB) 467, a configuration distributor 468, and a device collector 469.

The UI 470 may be a separate electronic device for an operator 480 to control the server 460. Also, the UI 470 may be included in the server 460. For example, the UI 470 may be an electronic device for minimizing inputs for controlling services and network devices. In addition, the UI 470 may be implemented based on the REST API 461.

The network service controller 462 may perform modeling for services and network devices based on signals input from the operator 480. For example, the network service controller 462 may control the service-device modeling function 463 and the service definition function 464. The network service controller 462 may perform the modeling of services and network devices based on a modeling language. The modeling language may be yet another next generation (YANG). For example, the network service controller 462 may generate a plurality of service-device modeling information through the service-device modeling function 463. In addition, the network service controller 462 may generate service definition information defining a mapping relationship among services and devices through the service definition function 464.

The service-device mapping function 465 may map a plurality of service-device modeling information and service definition information based on signals input from the REST API 465. For example, the REST API 461 may transmit service information input by the operator 480 via the UI 470 to the service-to-device mapping function 465. Here, the service-device mapping function 465 may map a plurality of service-device modeling information and service definition information based on the service information. The service-device mapping function 465 may transmit to the configuration engine 466 a result of mapping the plurality of service-device modeling information and service definition information.

The configuration engine 466 may generate service-device configuration information based on the result of mapping the plurality of service-device modeling information and service definition information. The server 460 may determine a network device to be configured based on the service-device configuration information.

The topology and configuration DB 467 may store all information generated by the server 460. The server 460 may update the service-device configuration information based on the information stored in the topology and configuration DB 467.

The configuration distributor 468 may receive the service-device configuration information from the configuration engine 466. The configuration distributor 468 may transmit a plurality of service-device configuration information to each of the corresponding networks 410 to 450 or the network devices 411 to 414. In this case, the configuration distributor 468 may utilize various protocols 490 for configuring each of the networks 410 to 450 or network devices 411 to 414. For example, the various protocols 490 may include at least one of a network configuration protocol (NETCONF), a simple network management protocol (SNMP), a representational state transfer (REST) API, a command line interface (CLI), a Web, and an OpenFlow.

The device collector 469 may receive network topology information from each of the networks 410 to 450 or network devices 411 to 414. The network topology information may be referred to as network state information. The topology and configuration DB 467 may store the received network topology information. The device collector 469 may determine whether each of the networks 410 to 450 or network devices 411 to 414 fails or not. Here, the device collector 469 may perform status management for each of the networks 410 to 450 or the network devices 411 to 414.

Figure 5:
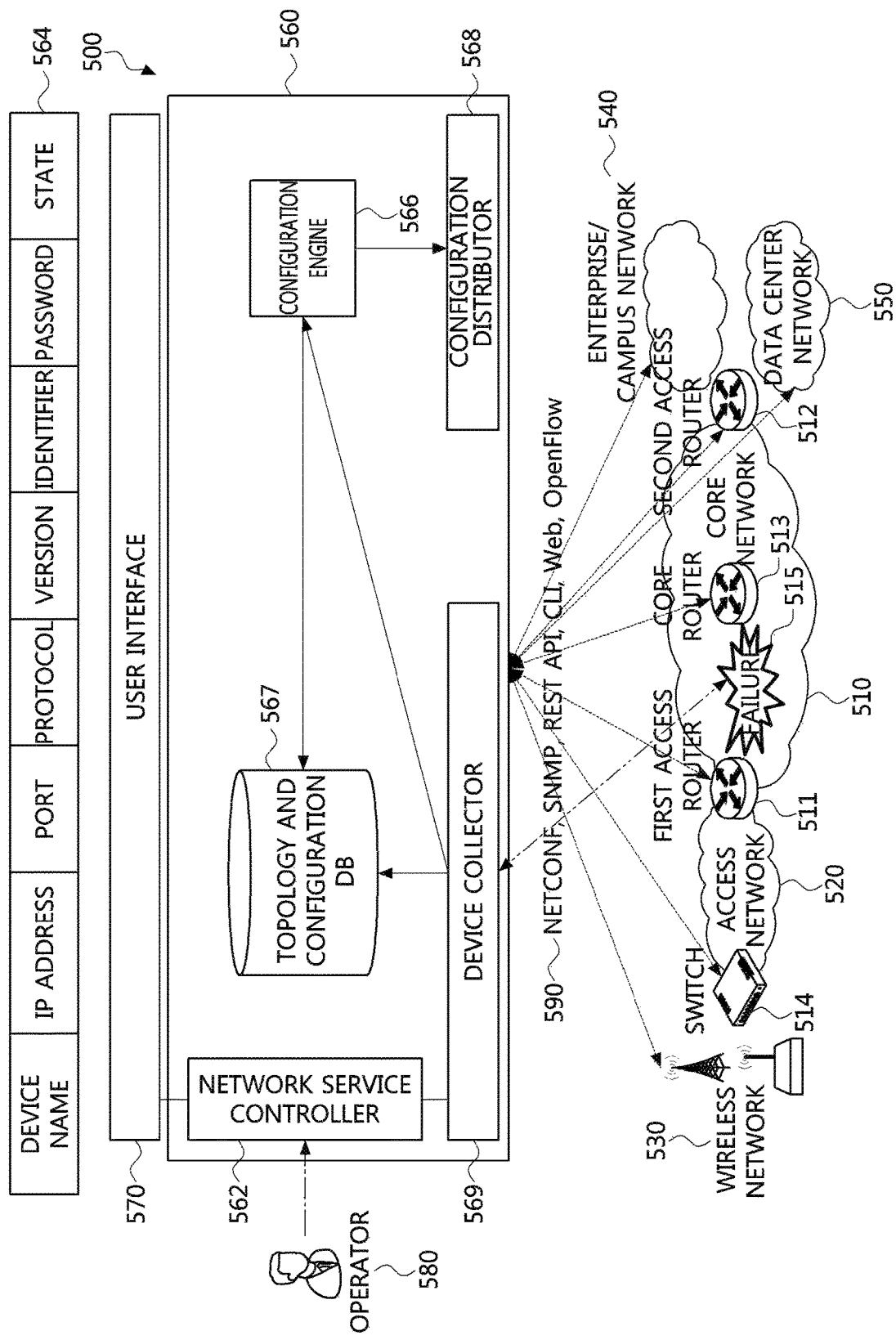
FIG. 5 is a conceptual diagram illustrating a network failure process of a server according to a third embodiment of the present disclosure.

FIG. 5 is a conceptual diagram illustrating a network failure process of a server according to a third embodiment of the present disclosure.

Referring to FIG. 5, a communication network 500 may include a core network 510 and an access network 520. The access network 520 may include a wireless network 530, an enterprise/campus network 540, a data center network 550, a server 560, and a UI 570. Sub-networks 510 to 550 and network devices 511 to 514 of the communication network 500 may be the same as or similar to the sub-networks 410 to 450 and network devices 411 to 414 of the communication network 400 of FIG. 4.

The device collector 569 of the server 500 may detect a failure occurring in the sub-networks 510 and 520 and the network devices 511 to 514. For example, the device collector 569 may detect a failure between the first access network 520 and the core router 513. In the case, the device collector 569 may generate network failure information regarding the failure between the first access network 520 and the core router 513. At this time, the server 560 may update service and network configuration information based on the network failure information. Also, the server 560 may update the service-network configuration information based on signals of the operator 580 input via the network service controller 562 or the UI 570. The method of updating the service-network configuration information may be similar to the method of generating the service-network configuration information of FIG. 4.

The topology and configuration DB 567 may store network device information 564. For example, the network device information 564 may include a device name, an Internet protocol (IP) address, a port, a protocol, a version, an identifier (ID), a password (PW), and a state. In this case, the state information may include the service-network configuration information. Also, the topology and configuration DB 567 may store information (not shown) to support the various protocols 590.

Figure 6:
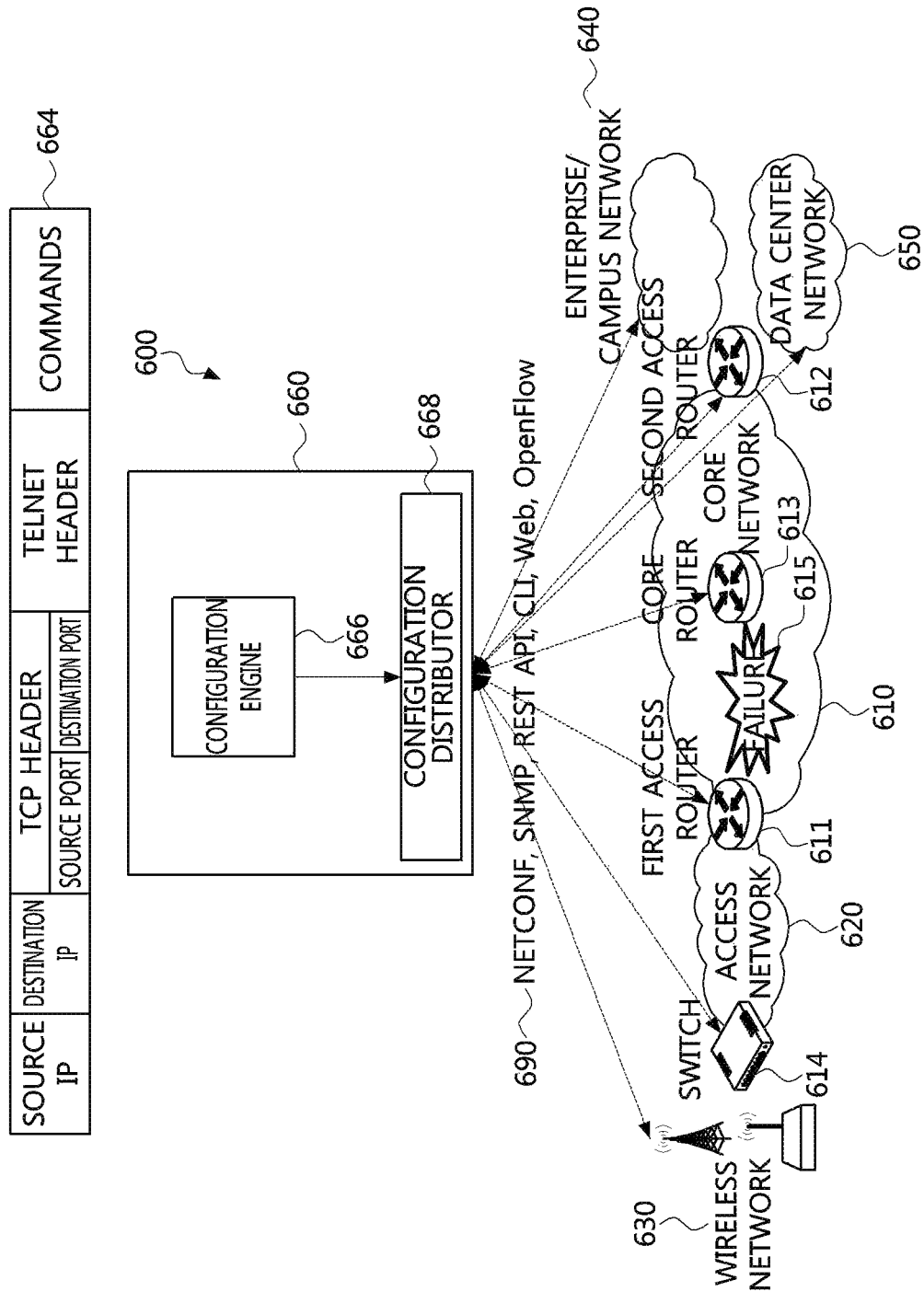
FIG. 6 is a conceptual diagram illustrating a control method for a network device using a transmission control protocol (TCP) of a server according to a third embodiment of the present disclosure.

FIG. 6 is a conceptual diagram illustrating a control method for a network device using a transmission control protocol (TCP) of a server according to a third embodiment of the present disclosure.

Referring to FIG. 6, a communication network 600 may include a core network 610 and an access network 620. The access network 620 may include a wireless network 630, an enterprise/campus network 640, a data center network 650, and a server 660. Sub-networks 610 to 650 and network devices 611 to 614 of the communication network 600 may be the same as or similar to the sub-networks 510 to 550 and network devices 511 to 514 of the communication network 500 of FIG. 5.

The sub-networks 610 to 650 or the network devices 611 to 614 may support a command line interface (CLI) and a tele-network (TELNET) protocol. At this time, the server 660 may store information 664 for supporting the TELNET protocol when the sub-networks 610 to 650 or the network devices 611 to 614 do not support the NETCONF protocol or the SNMP protocol. The information 664 for supporting the TELNET protocol may include a source IP address (Src.IP), a destination IP address (Dst.IP), a TCP header (TCP hdr), a source port (Src.Port), a destination port (Dst.Port), a TELNET header, and commands.

Figure 7:
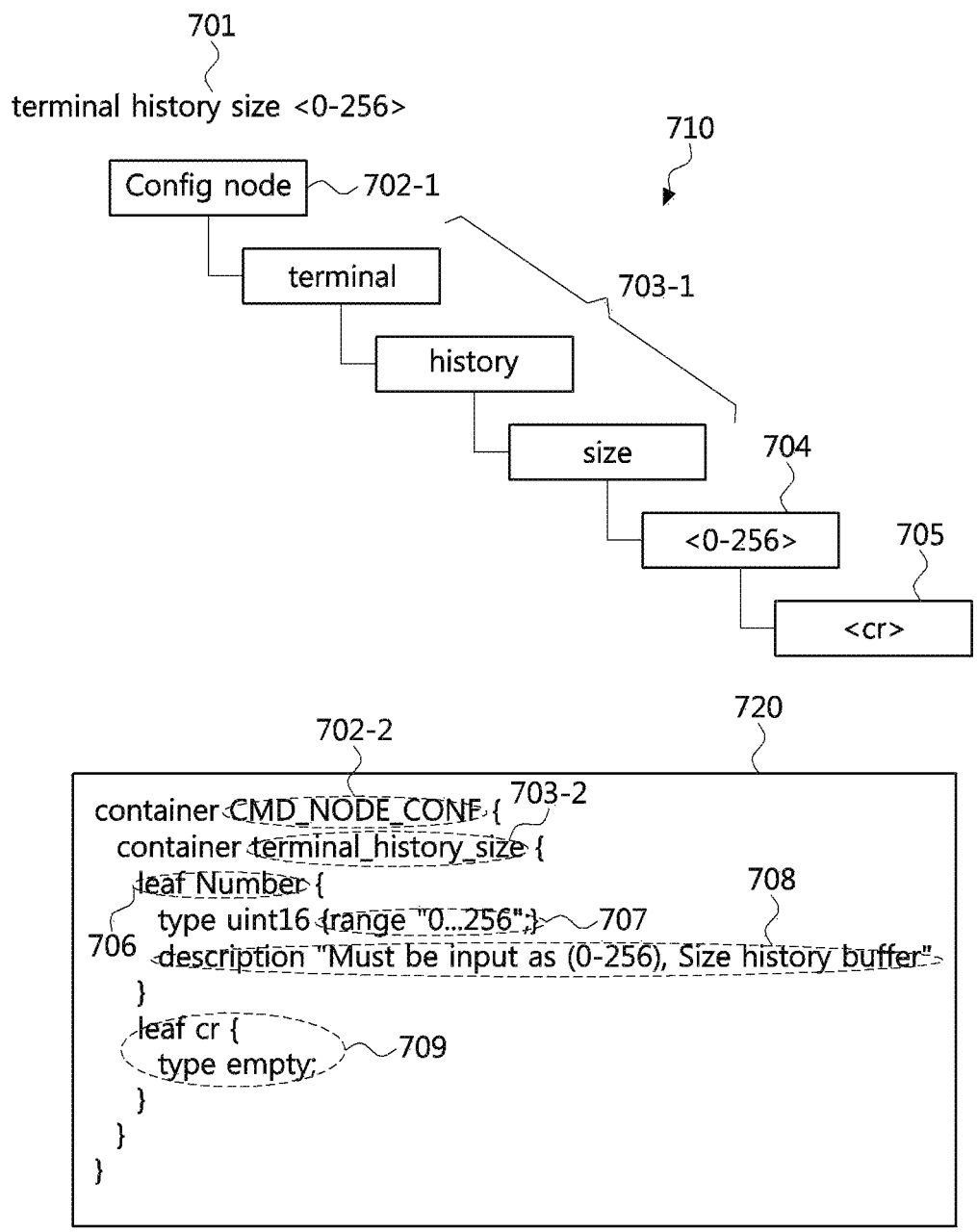
FIG. 7 is a conceptual diagram illustrating a network device modeling of a server according to a third embodiment of the present disclosure.

FIG. 7 is a conceptual diagram illustrating a network device modeling of a server according to a third embodiment of the present disclosure.

Referring to FIG. 7, a server (not shown) may perform modeling 710 on a network device. Here, the server may operate in the same or similar manner as the server 660 of FIG. 6. The server may perform the modeling on the network device according to signals of the operator (not shown) of the server input through the UI (not shown). For example, the UI may operate in the same or similar manner as the UI 670 of FIG. 6. That is, the server may display a modeling command window 720 via the UI.

The server may execute a configuration command for the network device. For example, the configuration command may be 'terminal history size <0-256>' 701. Typically, a modeling command may be started in a state in which command execution is possible. For example, the state in which command execution is possible may be represented as 'config node' 702-1 or 'CMD_NODE_CONF' 702-2.

According to the YANG syntax, the server may define words prior to at least one input value as a "container", including the state in which command execution is possible. For example, the words before the input value (i.e., container) may be represented as 'Config node' 702-1, 'CMD_NODE_CONF' 702-2, 'terminal history size' 703-1, and 'terminal_history_size' 703-2. When the input value is included, the server may define the input value as a 'leaf' 706. For example, the input value may be represented as <0-256>704 or '0 . . . 256' 707. Also, the input value may be defined as 'leaf Number {type unit16 {range "0 . . . 256";} description "Must be input as (0-256), Size history buffer"}'. The server may represent that the modeling command ends with a '<cr>' 705 or 709.

Figure 8:
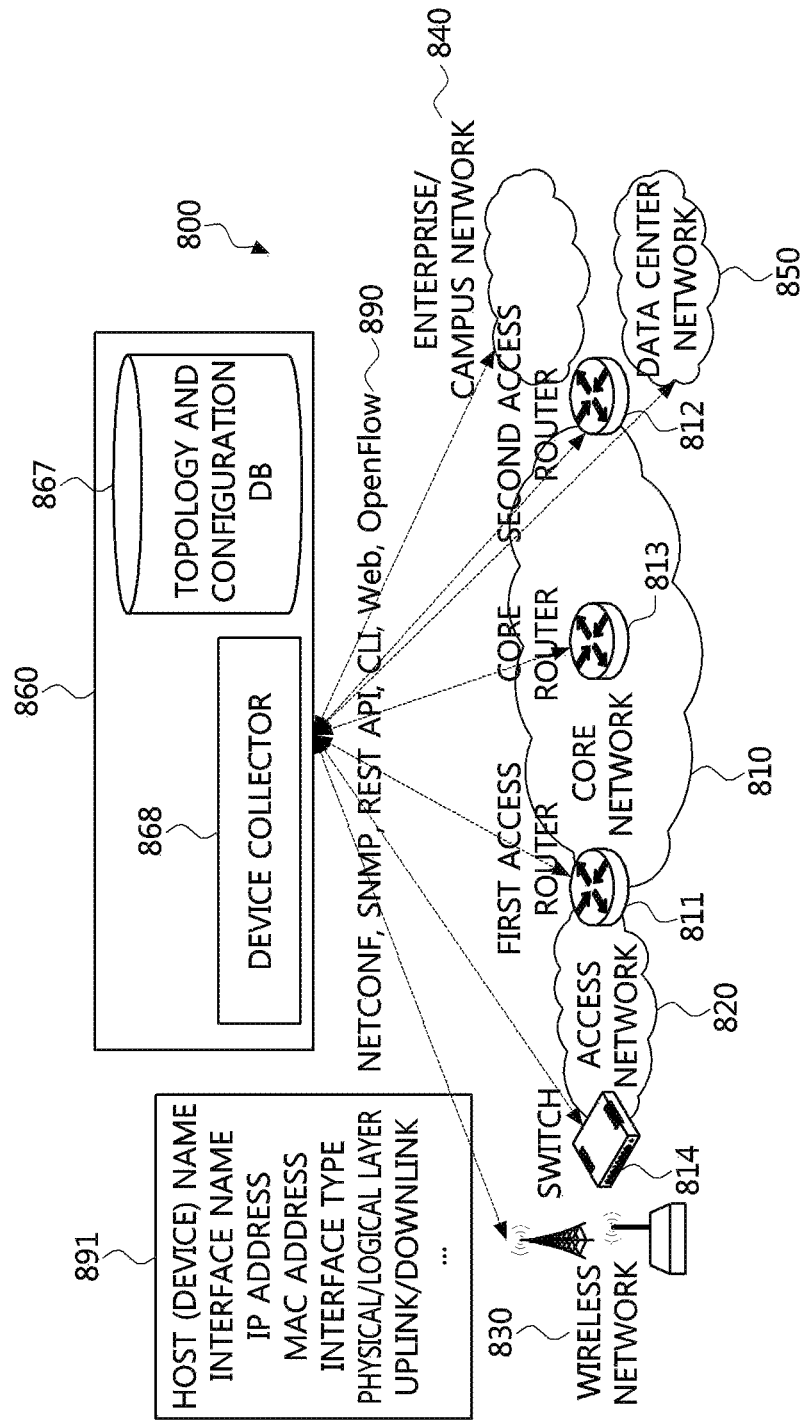
FIG. 8 is a conceptual diagram illustrating an operation of a device collector of a server according to a third embodiment of the present disclosure.

FIG. 8 is a conceptual diagram illustrating an operation of a device collector of a server according to a third embodiment of the present disclosure.

Referring to FIG. 8, a communication network 800 may include a core network 810 and an access network 820. The access network 820 may include a wireless network 830, an enterprise/campus network 840, a data center network 850, and a server 860. Sub-networks 810 to 850 and network devices 811 to 814 of the communication network 800 may be the same as or similar to the sub-networks 610 to 650 and network devices 611 to 614 of the communication network 600 of FIG. 6.

The device collector 868 of the server 860 may collect respective device information 891 from the sub-networks 810 to 850 or network devices 811 to 814. The device collector 868 may receive the respective device information 891 via various protocols. For example, the device collector 868 may collect the respective device information 891 using a trap of the SNMP, or a telemetry of the NETCONF protocol. The device information 891 may include a host or device name, an interface name, an IP address, a medium access control (MAC) address, an interface type, a physical/logical layer, and an uplink/downlink. Here, the information on the interface name and the interface type may be used for configuring a network topology. The topology and configuration DB 867 may store the device information 891.

Figure 9:
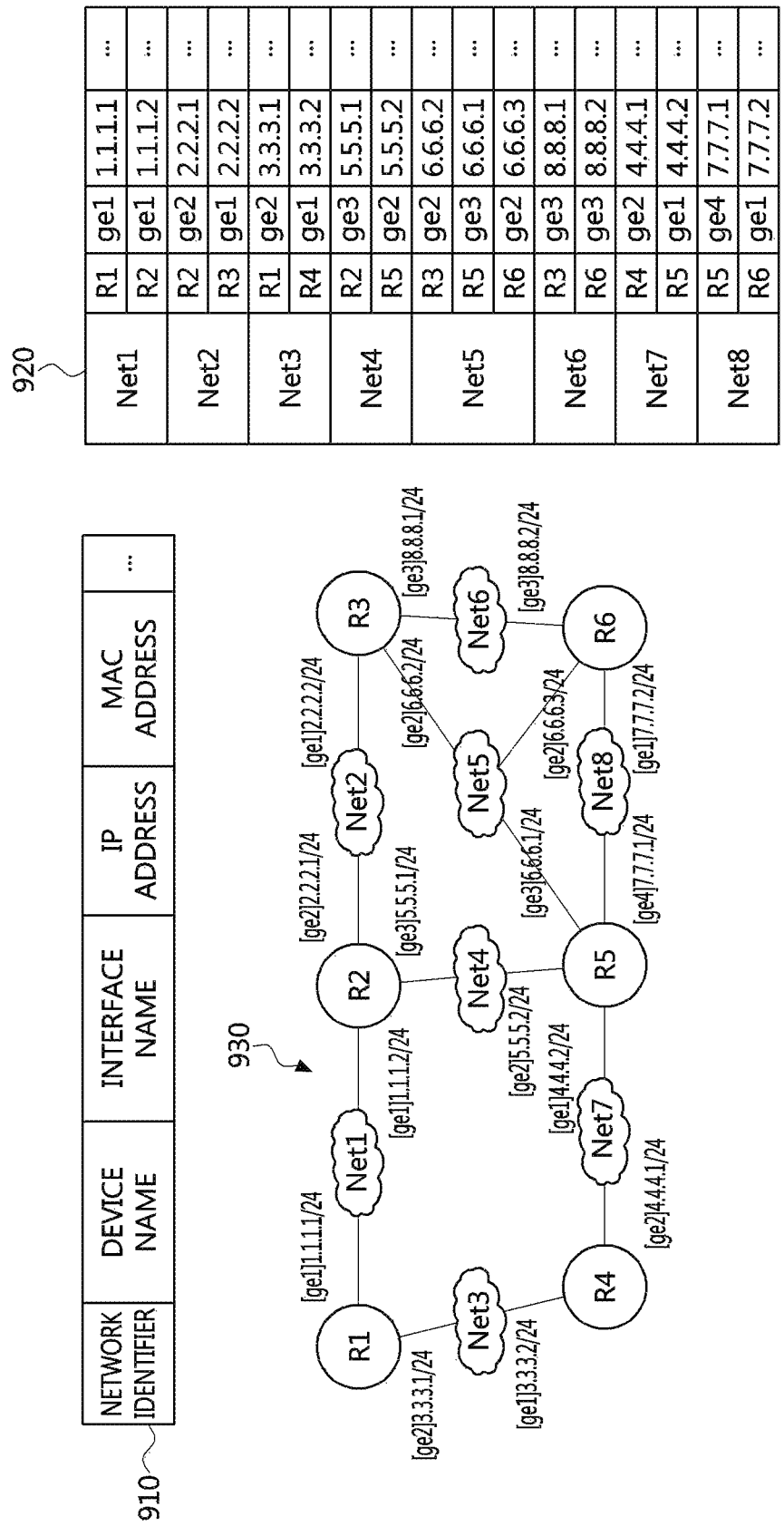
FIG. 9 is a conceptual diagram illustrating an operation for a server to generate a network topology in a communication network according to a third embodiment of the present disclosure.

FIG. 9 is a conceptual diagram illustrating an operation for a server to generate a network topology in a communication network according to a third embodiment of the present disclosure.

Referring to FIG. 9, a server (not shown) in a communication network (not shown) may receive device information 910 from sub-networks (not shown) or network devices (not shown) via the device collector (not shown). Here, the communication network may be the same as or similar to the communication network 800 of FIG. 8. Also, the server may operate in the same or similar manner as the server 860 of FIG. 8, and the device collector may operate in the same or similar manner as the device collector 868 of FIG. 8.

For example, the device information 910 may include information such as a network identifier, a device name, an IP address, a MAC address, and the like. The server may generate a device information list 920 based on the collected device information 910. Also, the server may display the device information list 920 and the network topology information 930 via the UI (not shown). Here, the user interface may operate in the same or similar manner as the UI 570 of FIG. 5.

For example, a network Net1 may be connected to a device R1 and a device R2. Here, the device R1 may use an interface ge1 and may have an IP address of (1.1.1.1), and the device R2 may use the interface ge1 and may have an IP address of (1.1.1.2). Also, a network Net2 may be connected to the device R2 and a device R3. Here, the device R2 may use an interface ge2 and may have an IP address of (2.2.2.1), and the device R3 may use the interface ge1 and may have an IP address of (2.2.2.2). Also, a network Net3 may be connected to the device R1 and a device R4. Here, the device R1 may use an interface ge2 and may have an IP address of (3.3.3.1), and the device R4 may use the interface ge1 and may have an IP address of (3.3.3.2). Also, a network Net4 may be connected to the device R2 and a device R5. Here, the device R2 may use an interface ge3 and may have an IP address of (5.5.5.1), and the device R5 may use the interface ge2 and may have an IP address of (5.5.5.2). Also, a network Net5 may be connected to the device R3, the device R5, and a device R6. Here, the device R3 may use the interface ge2 and may have an IP address of (6.6.6.2), the device R5 may use the interface ge3 and may have an IP address of (6.6.6.1), and the device R6 may use the interface ge2 and may have an IP address of (6.6.6.3). Also, a network Net6 may be connected to the device R3 and the device R6. Here, the device R3 may use the interface ge3 and may have an IP address of (8.8.8.1), and the device R6 may use the interface ge3 and may have an IP address of (8.8.8.2). Also, a network Net7 may be connected to the device R4 and a device R5. Here, the device R4 may use the interface ge2 and may have an IP address of (4.4.4.1), and the device R5 may use the interface ge1 and may have an IP address of (4.4.4.2). Also, a network Net8 may be connected to the device R5 and a device R6. Here, the device R5 may use an interface ge4 and may have an IP address of (7.7.7.1), and the device R6 may use the interface ge1 and may have an IP address of (7.7.7.2).

Figure 10:
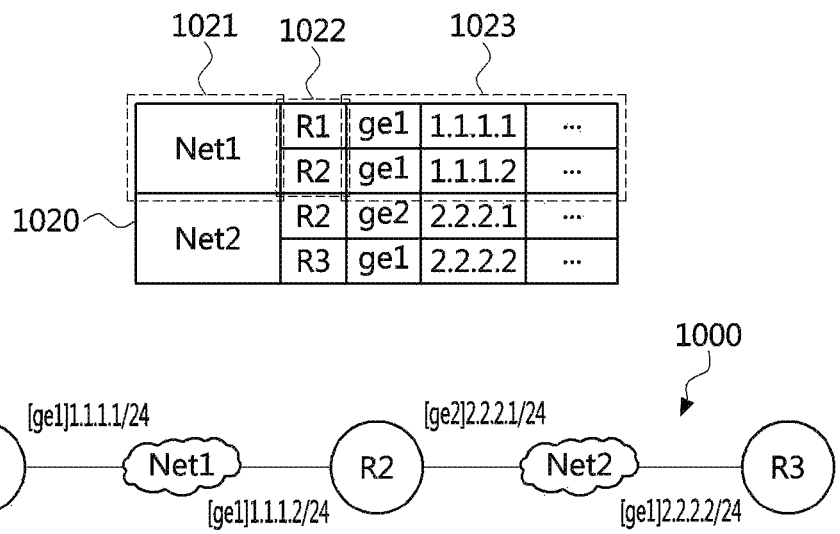
FIG. 10 is a conceptual diagram illustrating device information and network topology information displayed through a user interface in a communication network according to a third embodiment of the present disclosure.

FIG. 10 is a conceptual diagram illustrating device information and network topology information displayed through a user interface in a communication network according to a third embodiment of the present disclosure.

Referring to FIG. 10, in a communication network, an UI may display device information 1020 and network topology information 1000. Here, the communication network may operate in the same or similar manner as the communication network of FIG. 8. Also, the UI may operate in the same or similar manner as the UI of FIG. 8.

The UI may display the device information list 920 and the network topology information 930 of FIG. 9, and may receive selections for a network name item 1021, a device name item 1022, and other items 1023 from the operator. For example, the UI may receive selections from the operator for the network Net1 and the network Net2. In this case, the UI may display the device information 1020 related to the selected network Net1 and the network Net2, and the network topology information 1000 as shown in FIG. 10.

Figure 11:
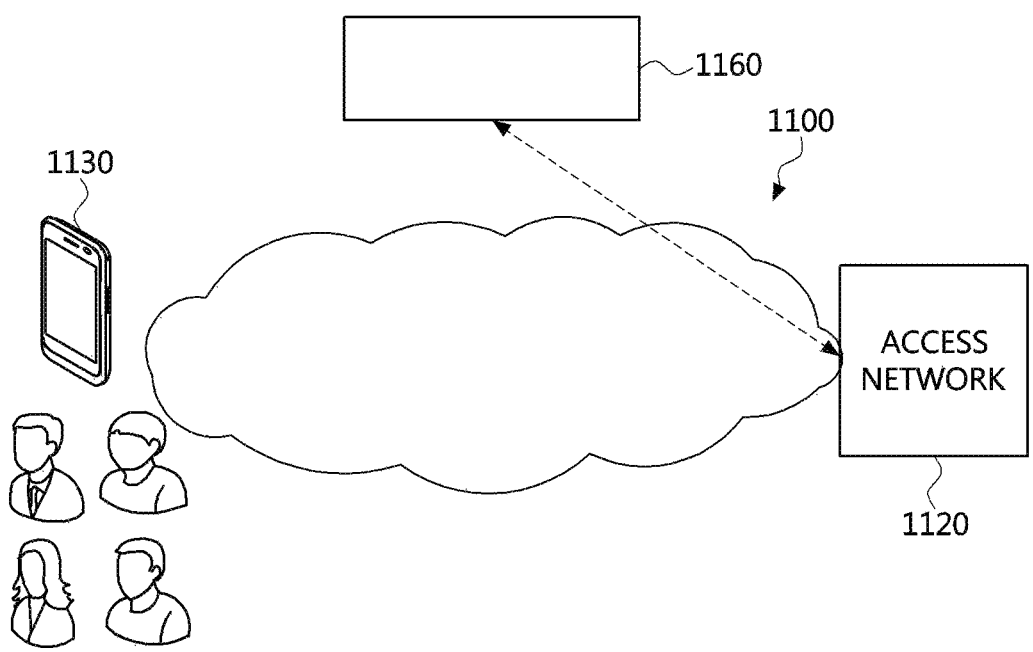
FIG. 11 is a conceptual diagram illustrating a single node service of a server in a communication network according to a third embodiment of the present disclosure.

FIG. 11 is a conceptual diagram illustrating a single node service of a server in a communication network according to a third embodiment of the present disclosure.

Referring to FIG. 11, in a communication network 1100, a server 1160 may provide a single node service. A single network device service may refer to a service to one node. For example, the server 1160 may perform control over an access network 1120 included in the communication network 1100. The server 1160 may control the access network

1120 by performing configuration for an access router (not shown) of the access network 1120 when controlling traffic to a user terminal 1130.

Here, the communication network 1100 may operate in the same or similar manner as the communication network 800 of FIG. 8. The server 1160 may operate in the same or similar manner as the server 860 of FIG. 8. The access network 1120 may operate in the same or similar manner as the access network 820 of FIG. 8. Also, the access router may operate in the same or similar manner as the first access router 811 of FIG. 8.

FIG. 12 is a conceptual diagram illustrating a multi-node service of a server in a communication network according to a third embodiment of the present disclosure.

Referring to FIG. 12, a communication network 1200 may include a core network 1210 and an access network 1220. The access network 1220 may include a wireless network 1230, an enterprise/campus network 1240, a data center network 1250, and a server 1260. Sub-networks 1210 to 1250 and network devices 1211 to 1214 of the communication network 1200 may be the same as or similar to the sub-networks 810 to 850 and network devices 811 to 814 of the communication network 800 of FIG. 8.

The server 1260 may provide a multi-node service. The multi-node service may refer to a service for a plurality of nodes. In other words, the server 1260 may provide a service for all the nodes in the communication network 1200. In this case, the server 1260 may provide the service for the plurality of nodes based on the network topology information of the communication network 1200, and the state information on each of the network devices 1211 to 1214.

FIG. 13 is a conceptual diagram illustrating a relationship between a service model and a device model generated by a server in a communication network according to the third embodiment of the present disclosure.

Referring to FIG. 13, the server may generate a service model 1310, a category model 1320, and a device model 1330. The device model 1330 may be associated with commands that can configure each network device. On the other hand, the service model 1310 may be independent of the configuration of the network device. The service model 1310 may include the category model 1320 that groups the commands associated with the defined service. The device model 1330 may be a hierarchical model of commands for controlling each network device. Here, the server may operate in the same or similar manner as the server 1260 of FIG. 12.

FIG. 14 is a conceptual diagram illustrating a category model generated by a server in a communication network according to the third embodiment of the present disclosure.

Referring to FIG. 14, the server may generate a category model 1420 based on each service. Here, the server may operate in the same or similar manner as the server in FIG. 13. Also, the category model 1420 may be the same as or similar to the category model 1320 of FIG. 13.

The category model 1420 may refer to information on functions of the network that can be performed using a combination of commands. For example, the server may generate an interface configuration category model 1421, an open shortest path first (OSPF) configuration category model 1422, or the like. Here, the interface configuration category model 1421 may be a combination of commands that can configure an interface. Also, the OSPF configuration category model 1422 may be a combination of commands that can configure the shortest path preferentially.

Each of the category models 1421 and 1422 may be grouped according to a vendor or a version of the network device. For example, the interface configuration category model 1421 may be grouped and classified into a model for a vendor A 1421-1 and a model for a vendor B 1421-2 depending on the vendor. Similarly, the OSPF configuration category model 1422 may be grouped and classified into a model for a vendor A 1422-1 and a model for a vendor B 1422-2 depending on the vendor.

The category model 1421 or 1422 may include the corresponding device model among the models 1431 to 1434. Here, the device models 1431 to 1434 may be the same as or similar to the device model 1330 in FIG. 13.

For example, the interface configuration category model 1421 may include the device model 1431 for a group of the vendor A 1421-1. Here, the device model 1431 for the group of vendor A 1421-1 may refer to a model for a network device manufactured by the vendor A. The device model 1431 may include configuration information 1441 for the interface of the vendor A's network device. For example, the configuration information 1441 may include information on a speed of the interface (e.g., 'speed (10|100|1000|auto)'), information on a duplex scheme (e.g., 'duplex (full|halflauto)'), and information on an IP address (e.g., 'ip address A.B.C.D/M').

Also, the interface configuration category model 1421 may include the device model 1432 for a group of the vendor B 1421-2. Here, the device model 1432 for the group of vendor B 1421-2 may refer to a model for a network device manufactured by the vendor B. The device model 1432 may include edit information 1442 for the interface of the vendor B's network device. For example, the edit information 1442 may include information on an interface to be configured (e.g., 'set interface IFNAME unit <0~16385>'), information on a speed of the interface (e.g., speed(10|100|1000|auto)), information on a duplex scheme (e.g., duplex(full|halflauto)), and information on an IP address (e.g., IP address (A,B,C,D/M)).

The OSPF configuration category model 1422 may include the device model 1433 for the vendor A 1422-1. Here, the device model 1433 may include configuration information 1443 for the shortest path of the network device of the vendor A. For example, the configuration information 1443 may include information on routers of the shortest path (e.g., 'router-id A, B, C, D'), information on a network area (e.g., 'network A. B.C.D/M area (A.B.C.D|<0-4294967295>)').

Also, the OSPF configuration category model 1422 may include the device model 1434 for the vendor B 1422-2. Here, the device model 1434 may include edit information 1444 for the shortest path of the network device of the vendor B. For example, the edit information 1444 may include information on a router to be configured (e.g., 'set routing-options router-id A.B.C.D') and information on a protocol and an interface to be configured (e.g., 'set protocols area A.B.C.D interface IFNAME').

Although FIG. 14 illustrates 2 category models 1421 and 1422 for ease of description, the number of category models may be less than 2 or more than 2. Also, although FIG. 14 illustrates 2 vendors 1421-1 (or, 1422-1) and 1421-2 (or, 1422-2) for ease of description, the number of category models may be less than 2 or more than 2.

Figure 15:
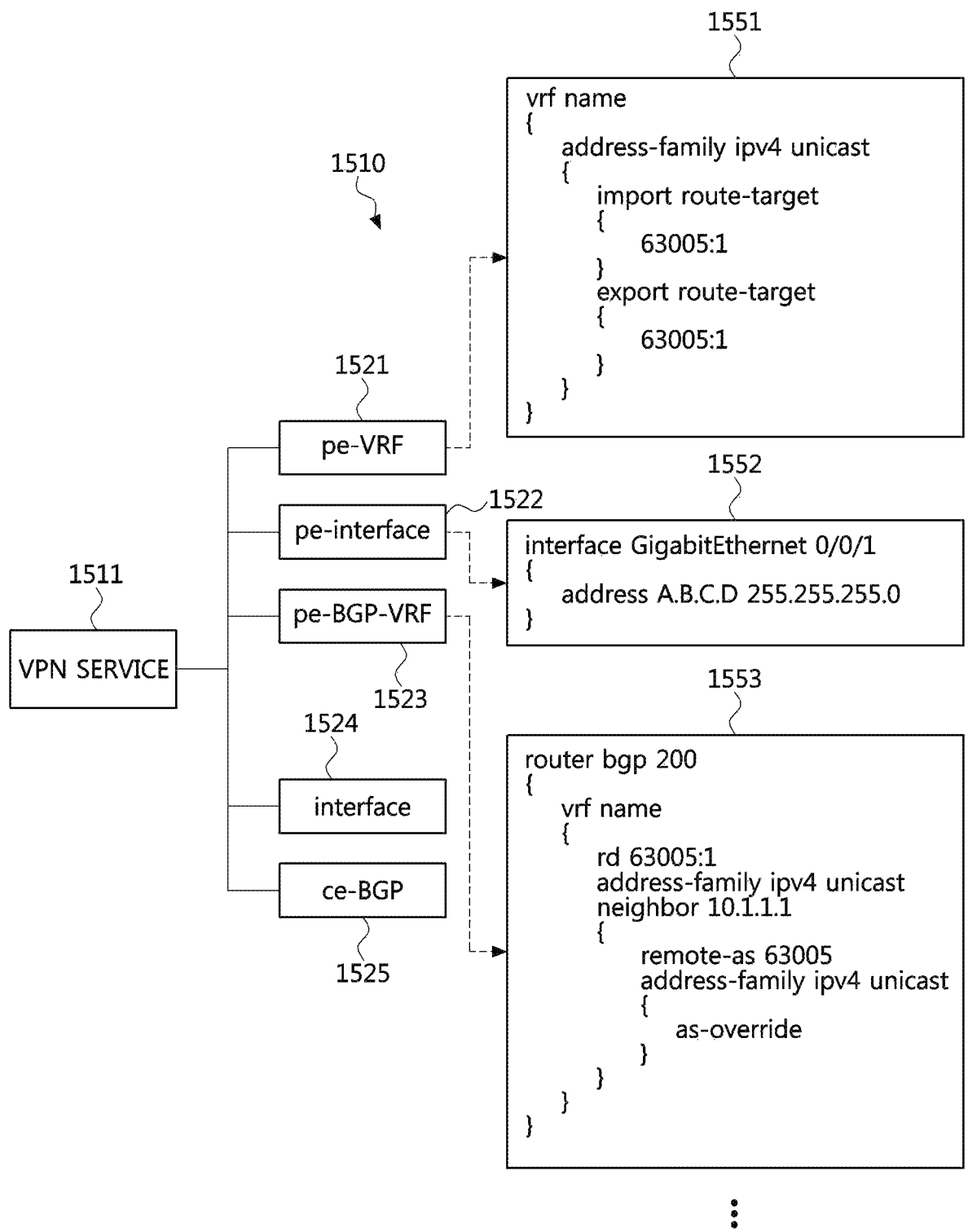
FIG. 15 is a conceptual diagram illustrating a service model generated by a server in a communication network according to a third embodiment of the present disclosure.

FIG. 15 is a conceptual diagram illustrating a service model generated by a server in a communication network according to a third embodiment of the present disclosure.

Referring to FIG. 15, the server may generate a service model 1510. The service model 1510 may refer to information on a service of the network that can be performed using a combination of commands. Here, the server may operate in the same or similar manner as the server in FIG. 14. The service model 1510 may be the same as or similar to the service model 1310 of FIG. 13. The service model 1510 may be generated regardless of the vendor or the version of the network device.

For example, the server may create a virtual private network (VPN) service model 1511. The VPN service model 1511 may include a plurality of sub-service models 1521 to 1524. The plurality of sub-service models 1521 to 1524 may include a provider edge-virtual routing and forwarding (pe-VRF) service model 1521, a pe-interface service model 1522, a pe-border gateway protocol (BGP) VRF (pe-BGP-VRF) service model 1523, an interface service model 1524, and a customer edge (ce)-BGP service model 1525. Here, the interface service model 1524 may be the same as or similar to the interface configuration service model 1421 of FIG. 14.

Also, each of the sub-service models 1521 to 1524 may include respective device models 1551 to 1553. Each of the device models 1551 to 1553 may refer to a combination of commands for performing a corresponding service in each network device. For example, each of the device models 1551 to 1553 may be generated in a form of an extensible markup language (XML). The server may transmit each of the device models 1551 to 1553 to each corresponding network device.

Although FIG. 15 illustrates one service model 1511 for convenience of description, the number of service models may exceed one. Also, the number of sub-service models of the service model 1511 may be less than 5 or more than 5.

Figure 16:
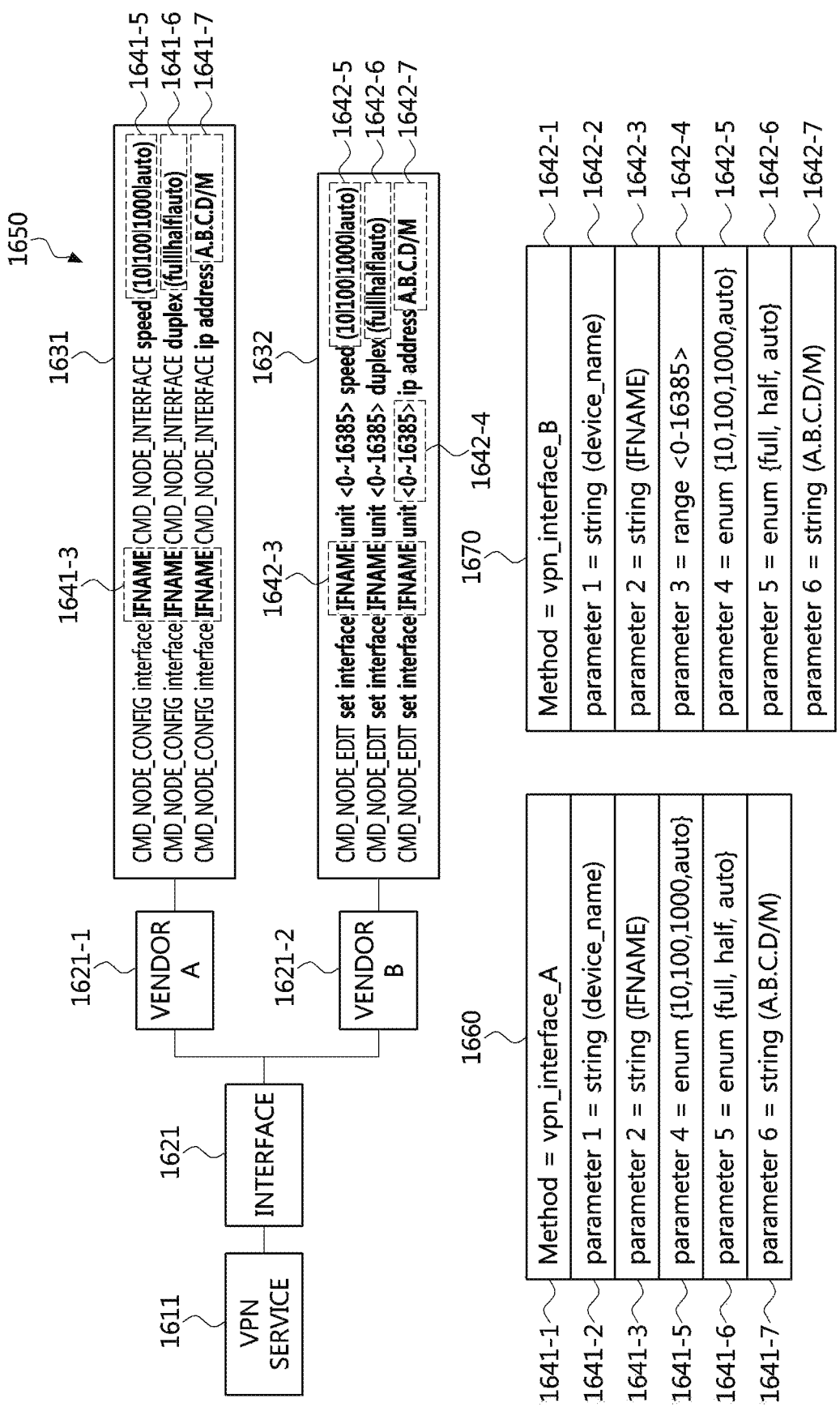
FIG. 16 is a conceptual diagram illustrating a REST API automatically generated by a server in a communication network according to a third embodiment of the present disclosure.

FIG. 16 is a conceptual diagram illustrating a REST API automatically generated by a server in a communication network according to a third embodiment of the present disclosure.

Referring to FIG. 16, the server (not shown) may generate a REST API (not shown) for a UI (not shown). Here, the server may operate in the same or similar manner as the server in FIG. 15. The UI may operate in the same or similar manner as the UI 470 of FIG. 4. Also, the REST API may operate in the same or similar fashion as the REST API 461 of FIG. 4.

The server may display service model structure information 1650, vendor A input information 1660, and vendor B input information 1670 via the UI. Here, the service model structure information 1650 may be the same as or similar to at least one of the category model 1420 of FIG. 14 and the service model 1410 of FIG.

The server may generate an interface category model 1621 of a VPN service model 1611. The server may also generate a device model 1631 for the vendor A group 1621-1 and a device model 1632 for the vendor B group 1621-2. In this case, the server may receive parameter values 1641-3, 1641-5 to 1641-7, and 1642-3 to 1642-7 for the respective device models 1631 and 1632. For example, the server may receive parameter values 1641-3, 1641-5 to 1641-7, and 1642-3 to 1642-7 from the operator (not shown) through the UI associated with the REST API. The server may automatically generate parameter values 1641-1 and 1642-1 for the service and vendor without any additional inputs.

Figure 17:
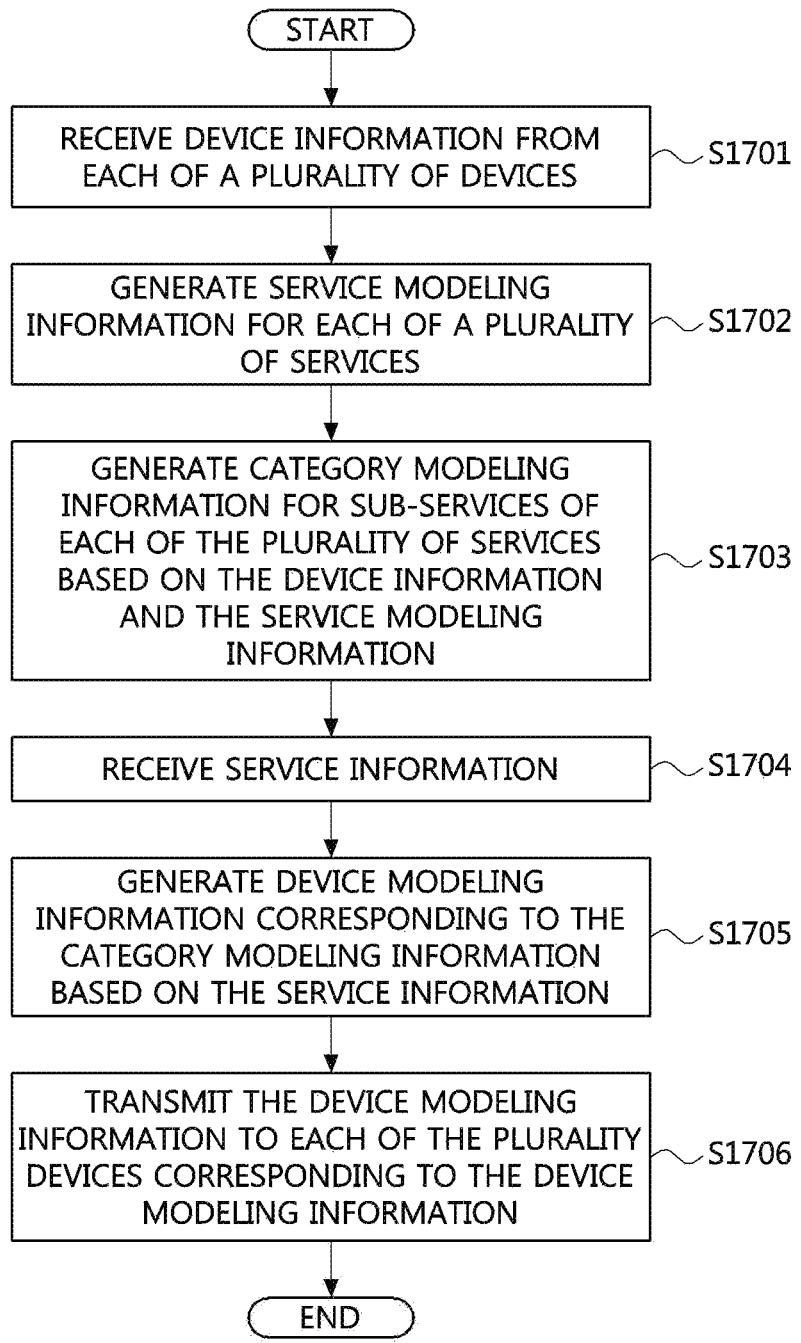
FIG. 17 is a flow chart illustrating an operation method of a server in a communication system according to a third embodiment of the present disclosure.

FIG. 17 is a flow chart illustrating an operation method of a server in a communication system according to a third embodiment of the present disclosure.

Referring to FIG. 17, an operation method of a server in a communication system may comprise receiving device information from a plurality of devices (S1701); generating service modeling information for each of a plurality of services (S1702); generating category modeling information for sub-services of each of the plurality of services based on the device information and the service modeling information (S1703); receiving service information (S1704); generating device modeling information corresponding to the category modeling information based on the service information (S1705); and transmitting the device modeling information to each of the plurality of devices corresponding to the device modeling information (S1706).

The device modeling information may include configuration information for a function of the network service corresponding to the device. The device information may be received through a communication protocol corresponding to each of the plurality of devices. The device modeling information may be transmitted through a communication protocol corresponding to each of the plurality of devices. The communication protocol scheme may include at least one of NETCONF, SNMP, REST API, CLI, Web, and OpenFlow.

The operation method of a server may further include transmitting the service modeling information to the plurality of devices. The service modeling information is represented by the XML, and may include configuration information for each of the sub-services.

The category modeling information may include configuration information on a function of a network service performed by a combination of commands, and may include the device modeling information.

The device information may include at least one of a device name, a communication interface name, an IP address, a MAC address, a communication interface type, a physical layer information, a logical layer information, an uplink information, and a downlink information.

The operation method may further include generating network topology information based on the device information; and outputting the network topology information through the user interface. The network topology information may include at least one of a network name, a device name, a communication interface name, an IP address, and a MAC address. The outputting the network topology information may include displaying a network icon corresponding to the network name, a device icon corresponding to the device name, a communication interface icon corresponding to the communication interface, and an IP address icon corresponding to the IP address; and displaying a connection relationship among the icons.

The operation method of a server may include receiving failure information from a corresponding device when a network failure occurs; and updating the service modeling information, the category modeling information, the device modeling information, and the network topology information based on the failure information. The service information may include at least one of a communication interface name, communication speed information, duplex scheme information, communication range information, and IP address information. The service modeling information, the category modeling information, and the device modeling information may be generated using the YANG data modeling language.

Here, the communication network may operate in the same or similar manner as the communication network 400 of FIG. 4. The server may operate in the same or similar manner as server 460 in FIG. 4. The devices may operate in the same or similar fashion as at least one of the sub-networks 410 to 450 and network devices 411 to 414 of FIG. 4.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a server in a communication system, the operation method comprising:
   receiving device information from each of a plurality of devices;
   generating service modeling information for each of a plurality of services;
   generating category modeling information for sub-services of each of the plurality of services based on the device information and the service modeling information;
   receiving service information;
   generating device modeling information corresponding to the category modeling information based on the service information; and
   transmitting the device modeling information to each of the plurality devices corresponding to the device modeling information,
   wherein the device modeling information includes configuration information for a network service function corresponding to a device corresponding to the device modeling information.

2. The operation method according to claim 1, wherein the device information is received through a communication protocol corresponding to each of the plurality of devices, the device modeling information is transmitted through a communication protocol corresponding to each of the plurality of devices, and the communication protocol includes at least one of a network configuration protocol (NETCONF), a simple network management protocol (SNMP), a representational state transfer (REST) application programming interface (API), a command line interface (CLI), a Web, and an OpenFlow.

3. The operation method according to claim 1, further comprising transmitting the service modeling information to the plurality of devices, wherein the service modeling information is represented by an extensible markup language (XML), and includes configuration information for each of the sub-services.

4. The operation method according to claim 1, wherein the category modeling information is information on a network function that is performed by a combination of commands, and includes the device modeling information.

5. The operation method according to claim 1, wherein the device information includes at least one of a device name, a communication interface name, an Internet protocol (IP) address, a medium access control (MAC) address, a communication interface type, physical layer information, logical layer information, uplink information, and downlink information.

6. The operation method according to claim 5, further comprising generating network topology information based on the device information; and outputting the network topology information through a user interface, wherein the network topology information includes at least one of a network name, a device name, a communication interface name, an IP address, and a MAC address.

7. The operation method according to claim 6, wherein the outputting the network topology information comprises displaying a network icon corresponding to the network name, a device icon corresponding to the device name, a communication interface icon corresponding to the communication interface, and an IP address icon corresponding to the IP address; and displaying a connection relationship among the icons.

8. The operation method according to claim 7, further comprising receiving failure information from a corresponding device when a network failure occurs; and updating the service modeling information, the category modeling information, the device modeling information, and the network topology information based on the failure information.

9. The operation method according to claim 1, wherein the service information includes at least one of a communication interface name, communication speed information, duplex scheme information, communication range information, and IP address information.

10. The operation method according to claim 1, wherein the service modeling information, the category modeling information, and the device modeling information are generated through a yet another next generation (YANG) data modeling language.

11. A server in a communication system, the server comprising a processor and a memory storing at least one instruction executed by the processor, wherein the at least one instruction is configured to receive device information from each of a plurality of devices; generate service modeling information for each of a plurality of services; generate category modeling information for sub-services of each of the plurality of services based on the device information and the service modeling information; receive service information; generate device modeling information corresponding to the category modeling information based on the service information; and transmit the device modeling information to each of the plurality devices corresponding to the device modeling information,
   wherein the device modeling information includes configuration information for a network service function corresponding to a device corresponding to the device modeling information.

12. The server according to claim 11, wherein the at least one instruction is further configured to receive the device information through a communication protocol corresponding to each of the plurality of devices, and transmit the device modeling information through a communication protocol corresponding to each of the plurality of devices, and the communication protocol includes at least one of a network configuration protocol (NETCONF), a simple network management protocol (SNMP), a representational state transfer (REST) application programming interface (API), a command line interface (CLI), a Web, and an OpenFlow.

13. The server according to claim 11, wherein the at least one instruction is further configured to transmit the service modeling information to the plurality of devices, wherein the service modeling information is represented by an extensible markup language (XML), and includes configuration information for each of the sub-services.

14. The server according to claim 11, wherein the category modeling information is information on a network function that is performed by a combination of commands, and includes the device modeling information.

15. The server according to claim 11, wherein the device information includes at least one of a device name, a communication interface name, an Internet protocol (IP) address, a medium access control (MAC) address, a communication interface type, physical layer information, logical layer information, uplink information, and downlink information.

16. The server according to claim 15, wherein the at least one instruction is further configured to generate network topology information based on the device information; and output the network topology information through a user interface, and the network topology information includes at least one of a network name, a device name, a communication interface name, an IP address, and a MAC address.

17. The server according to claim 16, wherein the at least one instruction is further configured to display a network icon corresponding to the network name, a device icon corresponding to the device name, a communication interface icon corresponding to the communication interface, and an IP address icon corresponding to the IP address; and display a connection relationship among the icons.

18. The server according to claim 17, wherein the at least one instruction is further configured to receive failure information from a corresponding device when a network failure occurs; and update the service modeling information, the category modeling information, the device modeling information, and the network topology information based on the failure information.

19. The server according to claim 11, wherein the service information includes at least one of a communication interface name, communication speed information, duplex scheme information, communication range information, and IP address information.

20. The server according to claim 11, wherein the service modeling information, the category modeling information, and the device modeling information are generated through a yet another next generation (YANG) data modeling language.

* * * * *